(12) United States Patent
Kühn et al.

(10) Patent No.: US 7,064,093 B2
(45) Date of Patent: Jun. 20, 2006

(54) QUARTZ GLASS BLANK FOR AN OPTICAL COMPONENT AND ITS UTILIZATION

(75) Inventors: Bodo Kühn, Hanau (DE); Bruno Uebbing, Alzenau (DE)

(73) Assignee: Heraeus Quarzglas GmbH & co., Hanau (DE)

( * ) Notice: Subject to any disclaimer, the term of this patent is extended or adjusted under 35 U.S.C. 154(b) by 225 days.

(21) Appl. No.: 10/310,276

(22) Filed: Dec. 5, 2002

(65) Prior Publication Data

US 2003/0119652 A1    Jun. 26, 2003

(30) Foreign Application Priority Data

Dec. 6, 2001    (DE) .............................. 101 59 959

(51) Int. Cl.
*C03C 3/06*    (2006.01)

(52) U.S. Cl. ...................................................... 501/54
(58) Field of Classification Search .................. 501/54
See application file for complete search history.

(56) References Cited

U.S. PATENT DOCUMENTS

| | | | |
|---|---|---|---|
| 6,380,110 B1 * | 4/2002 | Werdecker et al. ............ | 501/54 |
| 2003/0115905 A1 * | 6/2003 | Kuhn et al. .................... | 65/17.6 |

FOREIGN PATENT DOCUMENTS

| | | |
|---|---|---|
| EP | 0 401 845 A2 | 12/1990 |
| EP | 0 546 196 A1 | 6/1993 |
| EP | 0 673 888 A1 | 9/1995 |
| EP | 0673 888 A1 | 9/1995 |
| EP | 0 720 970 A1 | 7/1996 |
| EP | 1 061 052 A1 | 12/2000 |
| WO | WO 98/52879 | 11/1998 |
| WO | WO 99/38814 A | 8/1999 |

OTHER PUBLICATIONS

Transverse Zeeman Laser "Measurement of the Residual Birefringence Distribution in Glass Laser Disk", Electronics and Communications in Japan, Part 2, vol. 74, No. 5, 1991, pp. 21-28.
V.S. Khotimchenko, G.M. Sochivkin, I.I Novak, "Determining the Content of Hydrogen Dissolved in Quartz Glass Using the Methods of Raman Scattering and Mass Spectrometry", J. Appl. Spectrosc. 46 (6), pp. 632-635 (1987).
C.K. Van Peski, R. Morton, Z. Bor, "Behavior of Fused Silica Irradiated by Low Level 193 nm Excimer Laser for Tens of Billions of Pulses", Journal of Non-Crystalline Solids 265 (2000) pp. 285-289.
D.M. Dodd and D.B. Fraser, "Optical Determinations of OH in Fused Silica", J. Appl. Physics, May 25, 1966, p. 3911.
Patent Abstracts of Japan, vol. 018, No. 219, Apr. 20, 1994.
American Chemical Society, "Chemical Abstracts & Indexes", Columbus, Ohio, 118 (1993) No. 20, May 17, 1993.

* cited by examiner

*Primary Examiner*—Elizabeth D. Wood
(74) *Attorney, Agent, or Firm*—Tiajoloff & Kelly

(57) ABSTRACT

The present invention concerns a quartz glass blank for an optical component for the transmission of ultraviolet radiation of a wave length of 250 nm and under, as well as its utilization in microlithography in connection with ultraviolet radiation of a wavelength of 250 nm and under. Such quartz glass blank is to have low induced absorption, while being optimized in respect of compaction and de-compaction. The quartz glass blank according to the invention has the following properties:

Figure 1:
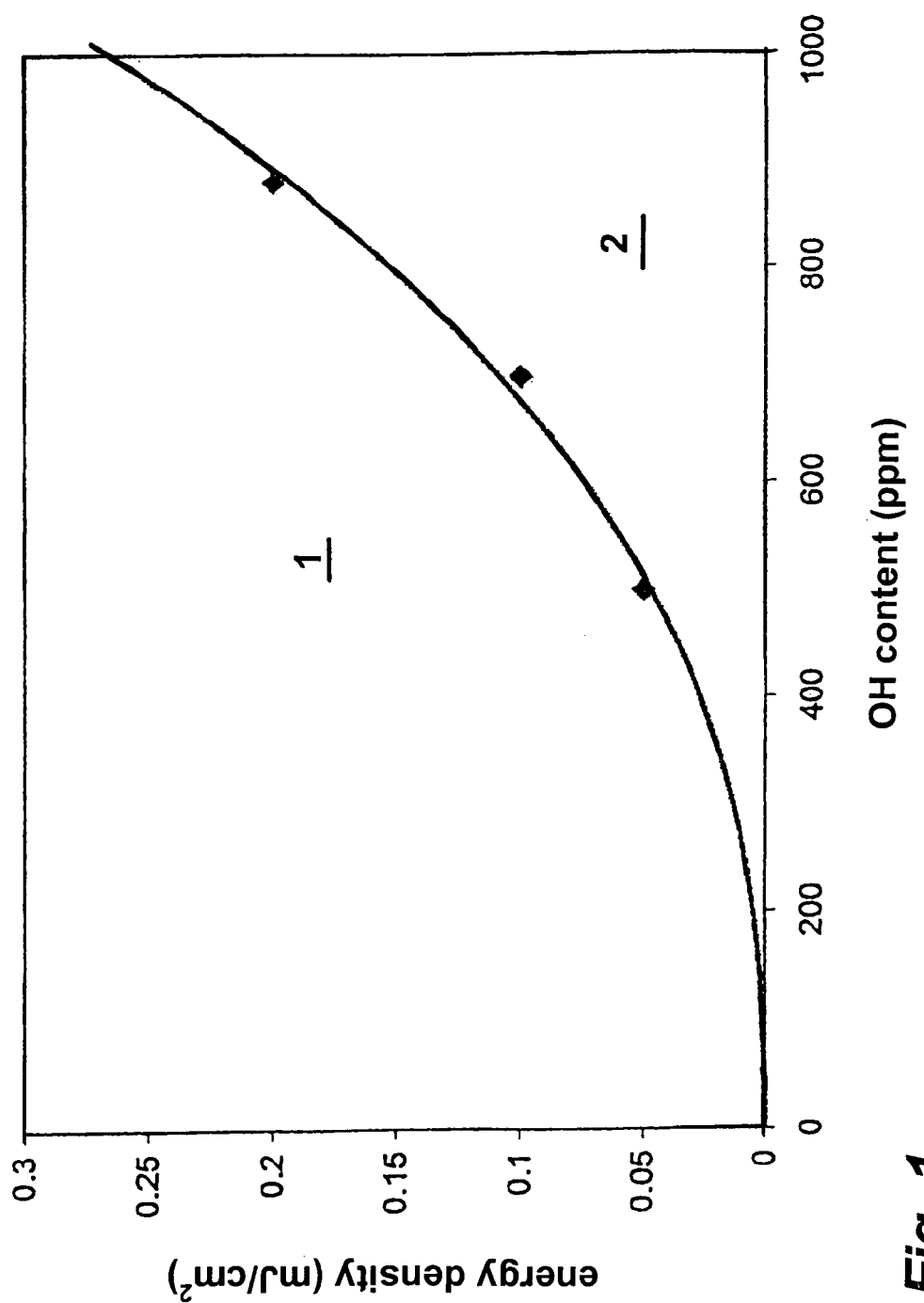

A glass structure essentially free of oxygen defect sites;
a $H_2$ content in the range of $3\times10^{17}$ molecules/cm$^3$ to $2.0\times10^{18}$ molecules/cm$^3$;
an OH content in the range of 500 weight ppm to 1000 weight ppm;
a SiH group content of less than $2\times10^{17}$ molecules/cm$^3$;
a chlorine content in the range of 60 weight ppm to 120 weight ppm;
a refractive index inhomogeneity, $\Delta n$, of less than 2 ppm; and
a stress birefringence of less than 2 nm/cm.

For utilization according to the invention, the quartz glass blank—in respect of its minimum and maximum hydrogen content, $C_{H2min}$ and $C_{H2max}$, as well as its OH content $C_{OH}$—is in accordance with the scaling laws (2), (3) and (4), and P standing for the pulse number and $\epsilon$ for the energy density:

$$C_{H2min}[\text{molecules/cm}^3] = 1.0\times10^8 \epsilon^2 P, \quad (2)$$

$$C_{H2max}[\text{molecules/cm}^3] = 2\times10^{19}\epsilon, \quad (3)$$

$$C_{OH}[\text{weight ppm}] = 1700\epsilon[\text{mJ/cm}^2]^{0.4} \pm 50. \quad (4)$$

22 Claims, 1 Drawing Sheet

QUARTZ GLASS BLANK FOR AN OPTICAL COMPONENT AND ITS UTILIZATION

Thus application may be considered related to co-pending U.S. patent applications 10/310,279 and 10/310,349, both filed on Dec. 5, 2002.

This invention concerns a quartz glass blank for an optical component for transmission of ultra-violet radiation of a wavelength of 250 nm and under.

Furthermore, the invention concerns the utilization of a quartz glass blank for the manufacture of a component for application in microlithography in connection with ultra-violet radiation of a wavelength of 250 nm and under.

Optical components of quartz glass are used above all for the transmission of high-energy ultraviolet laser radiation, for example as optical fibers, or in the form of optic lumination devices in microlithography systems for the manufacture of large-scale integrated circuits in semiconductor chips. The lumination systems of modern microlithography systems are equipped with excimer lasers radiating high-energy tunable UV radiation of a wavelength of 248 nm (KrF laser) or of 193 nm (ArF laser).

In optical components of synthetic quartz glass, short-wave UV radiation can cause damages resulting in absorptions. Type and extent of the damages and the absorption induced by it depend not only on the radiation conditions, but also on the quality of the respective quartz glass which is primarily defined by structural characteristics, as, e.g., density, gradient of the index of refraction, and homogeneity, as well as by the chemical composition.

A model formula describes the relation between radiation conditions, material factors, and the induced absorption $\alpha_{in}$ as follows:

$$\alpha_{in} = a \times \epsilon^b \times P \quad (1);$$

where a and b are the material factors, while $\epsilon$ and P stand for energy density and pulse number, respectively.

Accordingly, the number of the induced structural defects and the absorption induced by them depend on the number of the laser pulses applied and on their energy density, as well as on material factors.

The effect of the chemical composition of the quartz glass on damage behavior at radiation with high-energy UV light is, for example, described in EP-A1 401 845. According to the named patent, a quartz glass of high purity having an OH content ranging from 100 to approx. 1000 weight ppm, together with a hydrogen concentration of at least $5 \times 10^{16}$ molecules per cm$^3$ (in relation to the volume of the quartz glass), shows high radiation resistance. Moreover, the known synthetic quartz glass has a strain birefringence of under 5 nm/cm and is essentially free of places with oxygen damages.

Furthermore, EP-A1 401 845 describes methods for manufacture of synthetic quartz glass by flame hydrolysis of siliceous compounds. These compounds can be differentiated on the basis of the starting substances and the type of vitrification of the precipitated SiO$_2$ particles. In manufacture of synthetic quartz glass by flame hydrolysis, SiCl$_4$ is frequently used as a starting substance. Alternatively, other substances, e.g., chlorine-free siliceous organic compounds are used, for example hydrosilicon or siloxane. In any case, SiO$_2$ particles are precipitated in layers on a rotating substrate. With a sufficiently high temperature on the surface of the substrate, direct vitrification of the SiO$_2$ particles occurs ("direct vitrification"). In the so-called "soot method", however, the temperature during precipitation of the SiO$_2$ particles is kept so low that a porous soot body is formed in which SiO$_2$ particles are not vitrified or are vitrified to a low degree. With the soot method, vitrification to form quartz glass takes place by subsequent sintering of the soot body. Using both methods, a dense, transparent, high-purity quartz glass is manufactured, while the manufacturing costs are lower with the soot method than with direct vitrification.

To reduce mechanical tensions within the blank and to evenly distribute the fictive temperature, the blank is usually tempered. In EP-A-401 845, a tempering program is proposed in which the blank is subjected to a 50 hour holding period at a temperature of approximately 1100° C., is subsequently slowly cooled down to 900° C. with a cooling-down rate of 2°/h, and then cooled down to ambient temperature in the closed furnace. With this temperature treatment, the out-diffusion of components—above all hydrogen—can cause local changes to the chemical composition and result in a concentration gradient extending from the surface areas of the blank to its inside. To improve the radiation resistance of the quartz glass through the damage-healing effects of hydrogen, EP-A1 401 845 recommends a subsequent loading of the tempered quartz glass blank with hydrogen by treating it at increased temperature in a hydrogenous atmosphere.

In literature, a number of deterioration patterns are described where an increase of absorption occurred with continuing UV radiation. The induced absorption can show a linear increase, for example, or saturation achieved after an initial increase. Furthermore, it is observed that an initially registered absorption band disappears some minutes after the laser has been switched off, only to rapidly re-establish itself on the level that it reached previously responsive to renewed radiation. This behavior is called "rapid damage process" (RDP). The background of this behavior is the fact that hydrogen molecules saturate the network damages in the quartz glass; the stability of the linkages at the places of damage being low, however, these damages will re-appear on renewed radiation of the component. Moreover, damage behavior is known in which structural damages apparently cumulate to such a degree that a sudden sharp increase in absorption occurs. The sharp increase in absorption with the latter damage behavior is called SAT effect in the literature.

In the known quartz glass of EP-A1 401 845, UV radiation causes a comparatively low increase in absorption, so that this quartz glass is characterized by a high resistance to short-wave UV radiation. Besides absorption and/or reduced transmission, however, other damaging mechanisms can take effect as well, which may become evident in the generation of fluorescence or in a change of the refractive index.

A well-known phenomenon in this context is the so-called "compaction" which occurs during or after laser radiation with high energy density. This effect becomes apparent in a local increase of density resulting in an increase of the refractive index and thus to a deterioration of the imaging properties of the optical component. The opposite effect may occur as well, however, when an optical quartz glass component is exposed to laser radiation of low energy density and high pulse number. In these conditions, a so-called "de-compaction" is observed (also called "rarefaction" in the English literature), which is to be found together with a reduction of the refractive index. This results in a deterioration of the imaging properties. This damage mechanism is described by C. K. Van Peski, R. Morton, and Z. Bor ("Behaviour of Fused Silica Irradiated by Low Level 193 nm Excimer Laser for Tens of Billions of Pulses", J. Non-Cryst. Solids 265 (2000), p. 285–289).

Accordingly, compaction and de-compaction are damages which do not necessarily become apparent from an increase of the radiation-induced absorption, but which can reduce the life of an optical component.

This invention is therefore based on the task to provide for a blank of synthetic quartz glass for an optical component for transmission of ultraviolet radiation of a wavelength of 250 nm and less, which has a low induced absorption while being optimized in respect of compaction and de-compaction. Furthermore, the invention is based on the object of providing for a suitable utilization of this blank.

Regarding the blank, this object is met according to the invention by an embodiment of a quartz glass blank in which the following properties are combined:
- a glass structure which is essentially free of places with oxygen damage,
- a content of $H_2$ ranging from $3 \times 10^{17}$ molecules/cm$^3$ to $2.0 \times 10^{17}$ molecules/cm$^3$,
- an OH content ranging from 500 weight ppm to 1000 weight ppm;
- a content of SiH groups of under $2 \times 10^{17}$ molecules/cm$^3$,
- a non-uniformity in the refractive index $\Delta n$ of under 2 ppm, and
- a strain birefringence of under 2 nm/cm.

Here, a glass structure which is essentially free of places with oxygen damage is defined as a glass structure in which the concentration of oxygen undershoot damages and oxygen overshoot damages is below the limit detectable according to the Shelby method. This detection method is published in "Reaction of Hydrogen with OH-free Vitreous Silica" (J. Appl., Phys., vol. 51, no. 5 (May 1980), p. 2589–2593). This results in a number of oxygen undershoot damages or defects or oxygen overshoot damages or defects in the glass structure of not more than approximately $10^{17}$ per gram of quartz glass.

Ideally, the given components are evenly distributed over the volume of the optical component. Here, the given concentration data refer to the optically utilized part of the component.

The OH content is determined by measuring the IR absorption according to the method of D. M. Dodd et al. ("Optical Determinations of OH in Fused Silica"), (1966), p. 3911). The $H_2$ content is determined by a Raman measurement which was first suggested by Khotimchenko et al. ("Determining the Content of Hydrogen Dissolved in Quartz Glass Using the Methods of Raman Scattering and Mass Spectrometry") Zhurnal Prikladnoi Spektroskopii, vol. 46, no. 6 (June 1987), p. 987–991). The content of SiH groups is determined through Raman spectrometry, calibration taking place by means of a chemical reaction with hydrogen: Si—O—Si+$H_2$→Si—H+Si—OH, as described in Shelby "Reaction of Hydrogen with OH-free Vitreous Silica" (J. Appl. Phys., vol. 51, no. 5 (May 1980), p. 2589–2593). Chemically, the chlorine content of the quartz glass is determined by means of precipitating chlorine as silver chloride, or using an ion selective electrode.

In interferometry, the non-homogeneity of the refractive index $\Delta n$ is determined at a wave length of 633 nm (He—Ne laser), $\Delta n$ being the difference between the maximum value and the minimum value of the refractive index distribution, measured over the optically utilized area, also called CA ("clear aperture") area. The CA area is defined by projection of the irradiated volume onto a plane vertical to the direction of radiation.

In interferometry, the strain birefringence is determined at a wavelength of 633 nm (He—Ne laser) by means of the method described in "Measurement of the Residual Birefringence Distribution in Glass Laser Disk by Transverse Zeeman Laser" (Electronics and Communication in Japan, Part 2, Vol., 74, No. 5, 1991); (translated from Denshi Joho Tsushin Gakkai Ronbunshi vol. 73-C-I, no. 10, 1990, pp. 652–657).

In contrast to the quartz glass qualities described in prior literature which are designed with an eye to high radiation resistance to short-wave UV radiation, the quartz glass of the blank according to the invention is characterized, among other features, by relatively high $H_2$ and OH contents on the one hand, and on the other hand by a chlorine content with a comparably narrow range of concentration between 60 weight ppm and 120 weight ppm.

The manufacture of such quartz glass through the "soot method" described above is not without problems, because the quartz glass manufactured through the soot method usually has an OH content ranging from a minor number of weight ppm to 200 weight ppm, the $H_2$ content typically being below the detectablelimit as a consequence of the temperature treatments during vitrification and homogenization of the quartz glass. Quartz glass manufactured by direct vitrification, on the contrary, typically shows OH contents from 450 to 1200 weight ppm and OH contents of approximately $1 \times 10^{18}$ molecules/cm$^3$. It is surprising to find that, with such a quartz glass, chlorine has a positive effect on radiation resistance if it is present in a narrow concentration range between 60 weight ppm to 120 weight ppm. With a chlorine content of more than 120 weight ppm, an increase of induced absorption due to the interference of chlorine radicals in the generation of damage centers is observed (SiOSi+CL→SiCl+SiO→($H_2$+hv) SiOH+SiH+Cl), while a chlorine content of under 60 weight ppm has negative effects on the de-compaction behavior.

It has shown that in an optical component manufactured from a quartz glass blank of the above described properties, the damaging mechanisms resulting in compaction and de-compaction can be avoided or at least significantly reduced. In the course of the intended use of such components, changes to the refractive index are avoided completely or to a large degree, so that the described damage mechanisms will not limit the life of the optical components manufactured from the blank according to the invention.

This effect of the above-mentioned combination of properties on the damaging behavior in respect of short-wave UV radiation with energy densities of more than 0.05 mJ/cm$^2$ has been empirically shown, as will be explained in detail in the following. In this connection, it has also become evident that with these energy densities, OH contents of under 500 weight ppm lead to compaction. Quartz glass with an OH content of more than 1000 weight ppm shows a more pronounced tendency to de-compaction.

With $H_2$ contents of more than $2.0 \times 10^{18}$ molecules/cm$^3$, the damaging mechanism leading to RDP has especially significant effect. With an $H_2$ content of under $3 \times 10^{17}$ molecules/cm$^3$, however, the above damage-healing function of hydrogen in relation to short-wave UV radiation with energy densities exceeding 0.05 mJ/cm$^2$ is so small that there occur unacceptable transmission losses during the intended use of the optical component.

In contrast, the quartz glass of the blank according to the invention is optimized with respect to compaction as well as de-compaction, while simultaneously showing little induced absorption towards short-wave UV radiation.

It has proven to be especially advantageous when the OH content in the blank is in the range of 600 weight ppm to 900 weight ppm, and especially between 750 weight ppm and 900 weight ppm. An OH content in this range is a preferable compromise between de-compaction and compaction on the one hand, and RDP on the other hand, if the quartz glass is to be used with energy densities of more than 0.05 mJ/cm².

In this respect, the $H_2$ content is advantageously in a range of $5 \times 10^{17}$ molecules/cm³ to $1 \times 10^{18}$ molecules/cm³. With a quartz glass blank having an $H_2$ content in this range, the favorable, damage-healing function of hydrogen is present to an especially high degree, de-compaction being largely avoided at the same time.

Preferably, the quartz glass blank has a chlorine content in a range of 80 weight ppm to 100 weight ppm. With a chlorine content within these narrow concentration limits, low de-compaction and induced absorption is achieved, above all when the quartz glass blank is used in connection with UV radiation of high energy densities of more than 0.05 mJ/cm².

With respect to use of the quartz glass blank, the above task is met by the invention by selecting for use with ultraviolet radiation of a given pulse energy density $\epsilon$ of 0.05 mJ/cm² as a minimum and for a given pulse number P, a quartz glass having a minimum hydrogen content $C_{H2min}$ and a maximum hydrogen content $C_{H2max}$ in accordance with the following scaling laws:

$$C_{H2min}[\text{molecules/cm}^3] = 1.0 \times 10^8 \epsilon^2 P \quad (2),$$

and $$C_{H2max}[\text{molecules/cm}^3] = 2 \times 10^{19} \epsilon \quad (3).$$

By adjusting the hydrogen content according to the scaling laws (2) and (3), the quartz glass is further optimized with respect to its damage behavior towards short-wave UV radiation. From scaling law (2), there follows a minimum hydrogen concentration in dependence on the radiation conditions (pulse energy density and pulse number) below which the damage-healing function of hydrogen is so low that unacceptable transmission losses occur during the intended use of the optical component. Scaling law (3) defines an upper limit of hydrogen dependent on the pulse energy density, above which RDP and/or de-compaction occurs to an increased degree. The given hydrogen concentrations refer in each case to the optically utilized area within the quartz glass blank (CA area). Usually, this is the center area of the component and respectively the quartz glass blank.

Preferably, a quartz glass is selected having an OH content $C_{OH}$ in a range meeting the following scaling law:

$$C_{OH}[\text{weight ppm}] = 1700 \epsilon [\text{mJ/cm}^2]^{0.4} \pm 50 \quad (4)$$

Ideally, there will be neither compaction nor de-compaction. In practice, however, either compaction or de-compaction is observed depending on the radiation conditions and the properties of the quartz glass. Surprisingly, it was found that a quartz glass with an OH content according to scaling law (4) comes close to the described ideal, that is to say, it shows neither conspicuous compaction nor significant de-compaction on exposure to short-wave UV radiation of a wave length of <250 nm with a pulse energy density $\epsilon$ of more than 0.05 mJ/cm².

For a pulse energy density in the range of the above named lower limit $\epsilon=0.05$ mJ/cm², scaling law (4) results in an OH content of 513 weight ppm.

Scaling law (4) has proven to be valuable above all for the determination of the OH content in view of low compaction and simultaneously low de-compaction with a pulse energy density of under 0.3 mJ/cm², preferably under 0.15 mJ/cm².

For the upper limit $\epsilon=0.3$ mJ/cm², the OH content according to scaling law (4) is between 1000 weight ppm and 1100 weight ppm.

In the following, the invention is explained in details by way of embodiments and a drawing.

FIG. 1 is a diagram showing the occurrence of compaction or de-compaction dependent upon the OH content of the quartz glass and the pulse energy density of the radiation.

In the diagram in FIG. 1, the OH content $C_{OH}$ in weight ppm (in the Figure, given as "OH content" is graphed against the pulse energy density $\epsilon$ in mJ/cm² (in the Figure, given as "energy density"). The shown curve is based on damages measured in various quartz glass qualities with different OH contents. The measurements were taken using laser radiation of a wave length of 193 nm and with a laser pulse duration between 20 and 50 nanoseconds. The laser pulse duration is defined according to the method described in V. Liberman, M. Rothschild, J. H. C. Sedlacek, R. S. Uttaro, A. Grenville "Excimer-Laser-Induced Densification of Fused Silica: Laser-Fluence and Material-Grade Effects on Scaling Law", Journal Non-Cryst. Solids 244 (1999), p. 159–171.

The measured values determined under the described conditions are depicted in rhombic shape. The curve represents those $C_{OH}/\epsilon$ pairs in which neither compaction nor de-compaction is observed. The area (1) above the curve stands for the area where compaction occurs, and the area (2) below the curve stands for the area where de-compaction occurs.

The approximate course of the curve can be described by the formula (4):

$$C_{OH}[\text{weight ppm}] = 1700 \epsilon [\text{mJ/cm}^2]^{0.4} \pm 50 \quad (4)$$

Accordingly, by means of the curve or the formula (4), it is possible to select for every pulse energy density between 0.05 and 0.3 mJ/cm³, the OH content required by a quartz glass to show neither compaction nor de-compaction.

In Table 1, examples for such quartz glasses and examples for comparison are given.

TABLE 1

| 1 No. | 2 OH content [weight ppm] | 3 $H_2$ content [molecules/cm³] | 4 Ct content [weight ppm] | 5 SiH groups [molecules/cm³] | 6 O± [g⁻¹] | 7 Δn [ppm] | 8 Λ [nm/cm] | 9 $\epsilon$ [mJ/cm²] | 10 Compaction | 11 De-compaction |
|---|---|---|---|---|---|---|---|---|---|---|
| 1 | 700 | $1 \times 10^{18}$ | 90 | $7 \times 10^{16}$ | $<10^{17}$ | <2 | <2 | 0.1 | no | no |
| 2 | 700 | $1 \times 10^{18}$ | 90 | $7 \times 10^{16}$ | $<10^{17}$ | <2 | <2 | 0.3 | yes | no |
| 3 | 700 | $1 \times 10^{18}$ | 30 | $7 \times 10^{16}$ | $<10^{17}$ | <2 | <2 | 0.1 | no | yes |
| 4 | 700 | $1 \times 10^{18}$ | 200 | $7 \times 10^{16}$ | $<10^{17}$ | <2 | <2 | 0.1 | no | no |
| 5 | 880 | $5 \times 10^{17}$ | 90 | $<5 \times 10^{16}$ | $<10^{17}$ | <2 | <2 | 0.2 | no | no |

TABLE 1-continued

| 1 No. | 2 OH content [weight ppm] | 3 H$_2$ content [molecules/ cm$^3$] | 4 Ct content [weight ppm] | 5 SiH groups [molecules/ cm$^3$] | 6 O$^\pm$ [g$^{-1}$] | 7 Δn [ppm] | 8 Λ [nm/cm] | 9 ε [mJ/cm$^2$] | 10 Compaction | 11 De-compaction |
|---|---|---|---|---|---|---|---|---|---|---|
| 6 | 880 | 5 × 10$^{17}$ | 90 | <5× 10$^{16}$ | <10$^{17}$ | <2 | <2 | 0.05 | no | yes |
| 7 | 500 | 5 × 10$^{17}$ | 90 | <5× 10$^{16}$ | <10$^{17}$ | <2 | <2 | 0.05 | no | no |

Table 1 shows the results of the radiation measurements of quartz glass blanks of various chemical composition and with various irradiation conditions. In the three last columns of the table, it is shown in terms of quality whether the respective blank shows compaction, de-compaction or induced absorption.

The properties named in columns 2 to 8 are determined for one cylindrical quartz glass blank with an outside diameter of 240 mm and a thickness of 60 mm, such blanks being intended to be used as lenses for a microlithography unit working with excimer laser radiation with a wave length of 193 nm. Apart from a slight excess which remains to be removed on manufacturing the lens, the blank dimensions correspond to the lens dimensions. Here, the quartz glass volume corresponding to the CA area of the lens manufactured from it is defined by the circular area of the lens—minus a border of some millimeters for the mount of the lens—and by the thickness of the lens. In the column "O$^\pm$" of Table 1, the concentration of places with oxygen damage is given, in the column "ΔN" the refractive index determined through the CA area, and in the column "Λ" the maximum birefringence determined in the CA area.

For the radiation tests, bar-shaped samples of 25×25×200 mm$^3$ were taken from the respective quartz glass blank and prepared identically (polishing of the opposite 25×25 mm$^2$ areas).

To clarify the damage behavior of the samples with respect to compaction or de-compaction, the samples were subjected to UV radiation of a wave length of 193 nm, with varying pulse energy densities, as given in column 8 of Table 1. The pulse number was 5 billion in each of these irradiation tests.

In the column "Induced absorption", two damage mechanisms are combined which are evidenced by an increase of absorption, that is to say, a linear increase of absorption, and the RDP described previously. To clarify the damage behavior of the samples with respect to induced absorption, the samples were likewise subjected to UV irradiation of a wave length of 193 nm and the pulse energy density given in column 8. To determine the RDP, a pulse number of 1 million pulses is sufficient, the determination of the linear increase in absorption requiring a minimum pulse number of 1 billion pulses. For this purpose, the transmission loss of the sample is determined by defining during radiation the loss of intensity of the utilized laser beam after passing through the sample.

After the irradiation tests, compaction and de-compaction were defined by measuring the relative increase or reduction of the refractive index in the radiated area in comparison to the non-radiated area through a commercially available interferometer (Zygo GPI-XP) at a wave length of 633 nm.

The quartz glass blanks are designed for the manufacture of optical lenses for a microlithography unit for use with UV radiation of a wave length of 193 nm, the optical component during its intended use being typically exposed to radiation at an energy density of approx. 0.1 mJ/cm$^2$. The typical pulse numbers are between 10$^{11}$ and 10$^{12}$.

Blanks 1 to 4 of Table 1 were manufactured as follows:

They are of quartz glasses manufactured by the direct vitrification method. On a discoid substrate rotating around its central axis, fine-particle SiO$_2$ is precipitated by means of an oxyhydrogen burner, which SiO$_2$ is vitrified directly through the heat of the oxyhydrogen flame to form a bar-shaped quartz glass blank. In this process step, the hydrogen content is still approximately 2×10$^{18}$ molecules/ cm$^3$.

As can be seen from Table 1, blanks 1 to 4 differ only in their chlorine contents. The Cl content is adjusted by setting the flow rates for H$_2$, O$_2$ and SiCl$_4$.

Furthermore, according to scaling law (4), the OH content is determined which is set in connection with the typical pulse energy density in use, i.e. approx. 0.1 mJ/cm$^2$. The OH content is likewise set via the flow rates of the individual media (H$_2$, O$_2$ and SiCl$_4$). This results in an OH content of approx. 700 weight ppm, which thus is within a range specified by scaling law (4) for ε=0.1 mJ/cm$^2$ as follows:

$$C_{OH}[\text{weight ppm}]=1700\epsilon[\text{mJ/cm}^2]^{0.4}\pm 50 \rightarrow 677\pm 50 \text{ weight ppm}$$

Furthermore, the hydrogen content is determined according to scaling laws (2) and (3) corresponding to the settings required with the typical pulse energy density in use, i.e. approx. 0.1 mJ/cm$^2$. The set H$_2$ content is adjusted by tempering the blanks at 1100° C.

This results in an H$_2$ content of 1.4×10$^{16}$ molecules/cm$^3$, which—under consideration of the diffusion out during tempering the hot-formed lens blank (see below) (H$_2$ loss by diffusion out approx. 30%)—is within the limits C$_{H2min}$ and C$_{H2max}$ which are specified as follows by the scaling laws (2) and (3) for ε=0.1 mJ/cm$^2$.

$$C_{H2min}[\text{molecules/cm}^3]=1.0\times 10^8(0.1)^2 P$$

$$C_{H2max}[\text{molecules/cm}^3]=1.0\times 10^{19}(0.1)$$

According to this scaling law, and with ε=0.1 mJ/cm$^2$, the minimum H$_2$ content to be set in the quartz glass is determined as—depending on the pulse number—between 1×10$^{17}$ molecules/cm$^3$ and 10×10$^{17}$ molecules/cm$^3$, and the maximum H$_2$ content is determined as 2×10$^{18}$ molecules.

For homogenizing, the quartz glass blank is then clamped into a quartz glass lathe, heated in zones to a temperature of approx. 2000° C., and twisted. A suitable homogenizing method is described in EP-A1 673 888. After repeated twisting, a quartz glass body in the form of a round bar of a diameter of 80 mm and a length of approx. 800 mm is obtained, which is free from reams in three directions.

By hot-forming at a temperature of approx. 1,700° C. and using a nitrogen-swapped melting form, a circular quartz glass cylinder with an outside diameter of 240 mm and a length of 80 mm is formed from the above quartz glass body. After another tempering process in which the quartz glass cylinder is heated to 1100° C. in air at atmospheric pressure and subsequently cooled to 900° C. at a cooling rate of 2° C./h, a strain birefringence (in the CA area) of a maximum of only 2 nm/cm is measured, and the distribution of the refractive index is so homogeneous that the difference between the maximum and the minimum value is under $2\times10^{-6}$. From the center of the blank, a bar-shaped sample of $25\times25\times200$ mm$^3$ is taken, having an H$_2$ content of approx. $1\times10^{16}$ molecules/cm$^3$ and approx. 700 weight ppm OH. As with blanks 1–4, blanks 5–7 are manufactured by varying the flow rates of the individual media. The H$_2$ content of the resulting blanks is set by selecting the duration of the tempering program, and with consideration of the diffusion from tempering the heat-formed quartz glass cylinder.

Evaluation of the Result

Regarding the occurrence of compaction, de-compaction and induced absorption according to Table 1, blanks 1, 5, and 7 show the best results with energy densities of 0.1, 0.2 or 0.05 mJ/cm$^2$. Blank 2 shows compaction under influence of ultraviolet radiation with a relatively high energy density of 0.3 mJ/cm$^2$, which may be tolerable with certain limits in individual cases.

The invention claimed is:

1. A quartz glass blank for an optical component for transmission of ultraviolet radiation of a wave length of 250 nm and under, said quartz glass blank comprising a glass structure which is essentially free of oxygen defect sites, having an H$_2$ content in a range of $3\times10^{17}$ molecules/cm$^3$ to $2.0\times10^{18}$ molecules/cm$^3$, an OH content in a range of 500 weight ppm to 1000 weight ppm, an SiH group content of less than $2\times10^{17}$ molecules/cm$^3$, a chlorine content in a range of 60 weight ppm to 120 weight ppm, a non-homogeneity in a refractive index of less than 2 ppm, and a stress birefringence of less than 2 nm/cm.

2. A quartz glass blank according to claim 1, wherein the OH content is in a range of 600 weight ppm to 900 weight ppm.

3. A quartz glass blank according to claim 1, wherein the H$_2$ content is in a range of $5\times10^{17}$ molecules/cm$^3$ to $1\times10^{18}$ molecules/cm$^3$.

4. A quartz glass blank according to claim 1, wherein the chlorine content of the quartz glass blank is in a range of 80 weight ppm to 100 weight ppm.

5. A process for making a blank for manufacture of a component to be used in microlithography and subjected to a number of pulses of ultraviolet radiation having a wavelength that is 250 nm or less, said process comprising:

depositing and vitrifying particles so as to form a quartz glass blank according to claim 1; and wherein said quartz glass of the blank is selected such that, for use with ultraviolet radiation of a given pulse energy density $\epsilon$ of at least 0.05 mJ/cm$^2$ and for a given number P of pulses of said ultraviolet radiation, the quartz glass has a minimum hydrogen content $C_{H2min}$ and a maximum hydrogen content $C_{H2max}$ which are in accordance with the following formulas:

$C_{H2min}$[molecules/cm$^3$]=$1.0\times10^8\epsilon^2 P$, and $C_{H2max}$[molecules/cm$^3$]=$2\times10^{19}\epsilon$.

6. The process according to claim 5, wherein the OH content of the quartz glass blank is an OH content $C_{OH}$ which is in accordance with the following formula:

$C_{OH}$[weight ppm]=$1700\epsilon$[mJ/cm$^2$]$^{0.4}\pm50$.

7. The process according to claim 5, wherein the pulse energy density $\epsilon$ is under 0.3 mJ/cm$^2$.

8. A quartz glass blank according to claim 1, wherein the OH content is in a range of 750 weight ppm to 900 weight ppm.

9. The process according to claim 5, wherein the pulse energy density $\epsilon$ is under 0.15 mJ/cm$^2$.

10. A quartz glass blank according to claim 2, wherein the H$_2$ content is in a range of $5\times10^{17}$ molecules/cm$^3$ to $1\times10^{18}$ molecules/cm$^3$.

11. A process for making a blank for manufacture of a component to be used in microlithography and subjected to a number of pulses of ultraviolet radiation having a wavelength that is 250 nm or less, said process comprising:

depositing and vitrifying particles so as to form a quartz glass blank according to claim 2; and wherein said quartz glass of the blank is selected such that, for use with ultraviolet radiation of a given pulse energy density $\epsilon$ of at least 0.05 mJ/cm$^2$ and for a given number P of pulses of said ultraviolet radiation, the quartz glass has a minimum hydrogen content $C_{H2min}$ and a maximum hydrogen content $C_{H2max}$ which are in accordance with the following formulas:

$C_{H2min}$[molecules/cm$^3$]=$1.0\times10^8\epsilon^2 P$, and $C_{H2max}$[molecules/cm$^3$]=$2\times10^{19}\epsilon$.

12. The process according to claim 11, wherein the OH content of the quartz glass blank is an OH content $C_{OH}$ which is in accordance with the following formula:

$C_{OH}$[weight ppm]=$1700\epsilon$[mJ/cm$^2$]$^{0.4}\pm50$.

13. The process according to claim 12, wherein the pulse energy density $\epsilon$ is under 0.3 mJ/cm$^2$.

14. The process according to claim 12, wherein the pulse energy density $\epsilon$ is under 0.15 mJ/cm$^2$.

15. A process for making a blank for manufacture of a component to be used in microlithography and subjected to a number of pulses of ultraviolet radiation having a wavelength that is 250 nm or less, said process comprising:

depositing and vitrifying particles so as to form a quartz glass blank according to claim 3; and wherein said quartz glass of the blank is selected such that, for use with ultraviolet radiation of a given pulse energy density $\epsilon$ of at least 0.05 mJ/cm$^2$ and for a given number P of pulses of said ultraviolet radiation, the quartz glass has a minimum hydrogen content $C_{H2min}$ and a maximum hydrogen content $C_{H2max}$ which are in accordance with the following formulas:

$C_{H2min}$[molecules/cm$^3$]=$1.0\times10^8\epsilon^2 P$, and $C_{H2max}$[molecules/cm$^3$]=$2\times10^{19}\epsilon$.

16. The process according to claim 15, wherein the OH content of the quartz glass blank is an OH content $C_{OH}$ which is in accordance with the following formula:

$C_{OH}$[weight ppm]=$1700\epsilon$[mJ/cm$^2$]$^{0.4}\pm50$.

17. The process according to claim 16, wherein the pulse energy density $\epsilon$ is under 0.3 mJ/cm$^2$.

18. The process according to claim 16, wherein the pulse energy density $\epsilon$ is under 0.15 mJ/cm$^2$.

19. A process for making a blank for manufacture of a component to be used in microlithography and subjected to a number of pulses of ultraviolet radiation having a wavelength that is 250 nm or less, said process comprising:

depositing and vitrifying particles so as to form a quartz glass blank according to claim 8; and wherein said quartz glass of the blank is selected such that, for use with ultraviolet radiation of a given pulse energy density $\epsilon$ of at least 0.05 mJ/cm$^2$ and for a given number P of pulses of said ultraviolet radiation, the quartz glass has a minimum hydrogen content $C_{H2min}$ and a maximum hydrogen content $C_{H2max}$ which are in accordance with the following formulas:

$$C_{H2min}[\text{molecules/cm}^3]=1.0\times10^8\epsilon^2 P, \text{ and}$$

$$C_{H2max}[\text{molecules/cm}^3]=2\times10^{19}\epsilon.$$

20. The process according to claim 19, wherein the OH content of the quartz glass blank is an OH content $C_{OH}$ which is in accordance with the following formula:

$$C_{OH}[\text{weight ppm}]=1700\epsilon[\text{mJ/cm}^2]^{0.4}\pm50.$$

21. The process according to claim 19, wherein the pulse energy density $\epsilon$ is under 0.3 mJ/cm$^2$.

22. The process according to claim 19, wherein the pulse energy density $\epsilon$ is under 0.15 mJ/cm$^2$.

\* \* \* \* \*